(12) United States Patent
Fallon

(10) Patent No.: US 12,058,091 B1
(45) Date of Patent: Aug. 6, 2024

(54) MANAGEMENT OF ONLINE COMMUNICATION GROUPS FOR COMMUNICATION SYSTEMS

(71) Applicant: Cisco Technology, Inc., San Jose, CA (US)

(72) Inventor: Raymond M Fallon, County Galway (IE)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 18/354,106

(22) Filed: Jul. 18, 2023

(51) Int. Cl.
| | |
|---|---|
| *H04L 51/216* | (2022.01) |
| *H04L 51/48* | (2022.01) |
| *H04L 51/56* | (2022.01) |
| *H04L 51/58* | (2022.01) |
| *H04L 51/10* | (2022.01) |

(52) U.S. Cl.
CPC ............ *H04L 51/216* (2022.05); *H04L 51/48* (2022.05); *H04L 51/56* (2022.05); *H04L 51/58* (2022.05); *H04L 51/10* (2013.01)

(58) Field of Classification Search
CPC ....... H04L 51/216; H04L 51/48; H04L 51/52; H04L 51/56; H04L 51/58; H04L 51/10; H04L 51/102
USPC .......................... 709/220, 224, 226, 228, 203
See application file for complete search history.

(56) References Cited

U.S. PATENT DOCUMENTS

| | | | | |
|---|---|---|---|---|
| 8,214,238 B1 * | 7/2012 | Fairfield | ............ | G06Q 30/0203 705/7.29 |
| 8,621,088 B2 * | 12/2013 | Fujihara | .................. | H04L 51/00 709/227 |
| 10,476,686 B2 * | 11/2019 | Sato | ....................... | H04L 67/303 |
| 10,587,553 B1 | 3/2020 | Ghafourifar et al. | | |
| 10,673,799 B2 | 6/2020 | Costello et al. | | |
| 10,813,031 B2 * | 10/2020 | Mendiola | .................. | H04B 7/15 |
| 11,405,225 B1 | 8/2022 | Bansal et al. | | |
| 11,750,539 B2 * | 9/2023 | Treat | ..................... | H04L 51/212 709/206 |

(Continued)

FOREIGN PATENT DOCUMENTS

| | | | | |
|---|---|---|---|---|
| AU | 2009304581 A1 * | 4/2011 | ....... | G06F 17/30864 |
| CA | 2247498 C * | 1/2007 | ......... | G06Q 30/0601 |
| CN | 100405870 C * | 7/2008 | | |

OTHER PUBLICATIONS

WhatsApp, "Message Privately," WhatsApp Web, retrieved from https://www.whatsapp.com/?lang=en, on Jul. 12, 2023, 7 pages.

(Continued)

*Primary Examiner* — Khanh Q Dinh

(74) *Attorney, Agent, or Firm* — Edell, Shapiro & Finnan, LLC

(57) ABSTRACT

In one example embodiment, a communication group for a communication space is determined from among a plurality of communication groups of a communication system based on comparisons of a plurality of attributes of the communication space to corresponding attributes and content of the plurality of communication groups. The communication space includes communication sessions between members and the plurality of communication groups include one or more from a group of communication spaces and communication threads. The communication space is placed within the communication group on the communication system.

20 Claims, 11 Drawing Sheets

(56) References Cited

U.S. PATENT DOCUMENTS

| | | | |
|---|---|---|---|
| 11,763,919 B1* | 9/2023 | Jain | G16H 40/63 |
| | | | 715/221 |
| 2011/0214069 A1* | 9/2011 | Jung | G06Q 10/10 |
| | | | 715/752 |
| 2012/0290950 A1* | 11/2012 | Rapaport | H04L 12/1818 |
| | | | 715/753 |
| 2013/0282603 A1* | 10/2013 | Gaedcke | G06Q 30/01 |
| | | | 705/319 |
| 2014/0280602 A1 | 9/2014 | Quatrano | |
| 2018/0124129 A1 | 5/2018 | Geisler et al. | |
| 2019/0263932 A1* | 8/2019 | Beidler | C07K 16/40 |
| 2020/0067854 A1 | 2/2020 | Hewitt et al. | |
| 2020/0204848 A1* | 6/2020 | Johnson | H04N 7/188 |
| 2020/0302817 A1* | 9/2020 | Williams | G09B 7/02 |
| 2020/0360826 A1* | 11/2020 | Schmidt | E04H 3/10 |
| 2021/0006614 A1* | 1/2021 | Oyman | H04N 19/30 |
| 2021/0243142 A1* | 8/2021 | Treat | H04L 51/04 |
| 2022/0222261 A1* | 7/2022 | Zhang | G06F 16/24578 |
| 2023/0401274 A1* | 12/2023 | Denninghoff | G06Q 30/0251 |

OTHER PUBLICATIONS

Discord, "Imagine a Place . . . ," retrieved from https://discord.com/, on Jul. 12, 2023, 4 pages.

Microsoft, "What is Microsoft Teams?," Microsoft Teams support, retreived from https://support.microsoft.com/en-us/topic/what-is-microsoft-teams-3de4d369-0167-8def-b93b-0eb5286d7a29, on Jul. 12, 2023, 3 pages.

Slack, "One platform for your team and your work," retrieved from https://slack.com, on Jul. 12, 2023, 6 pages.

\* cited by examiner

MANAGEMENT OF ONLINE COMMUNICATION GROUPS FOR COMMUNICATION SYSTEMS

TECHNICAL FIELD

The present disclosure relates to online communication or collaboration systems.

BACKGROUND

Conversation threads may be grouped in various collaboration products. Conversation threads may be associated with either a team of individuals or with no parent team, or may be one-on-one conversations between individuals. The groupings of conversation threads are typically created and managed manually by a user to help organize the conversation threads. The groupings make organizing conversations easier than leaving the conversation threads isolated. However, since manually managing the groupings incurs extra work and inconvenience, users may not use groupings as often. For example, when a conversation thread is created, the conversation thread is not placed in a grouping, nor is a grouping suggested. If placement of the conversation thread in a grouping is desired, a user manually selects a grouping for the conversation thread.

Further, when a user is invited to a conversation thread, the conversation thread may be placed in a residual or catch-all grouping and is not automatically added to a relevant grouping. Although this may be satisfactory, it fails to resolve arrangement of the conversation threads based on relevancy. Moreover, groupings may have many related conversation threads, where some conversation threads may become inactive over time and create or add to clutter, thereby negating the benefit of grouping conversations.

DETAILED DESCRIPTION

Overview

In one example embodiment, a communication group for a communication space is determined from among a plurality of communication groups of a communication system based on comparisons of a plurality of attributes of the communication space to corresponding attributes and content of the plurality of communication groups. The communication space includes communication sessions between members and the plurality of communication groups include one or more from a group of communication spaces and communication threads. The communication space is placed within the communication group on the communication system.

Example Embodiments

An example embodiment uses a mix of logic and artificial intelligence (AI) to make organization of communication spaces in communication groups more effective. The example embodiment automatically manages communication groups (e.g., including communication spaces and one-on-one (1:1) conversations) by analyzing a title or name, members, and content of communication spaces in collaboration tools using machine learning (e.g., large language models (LLM), etc.) and generative AI.

While the present embodiments are described with respect to communication groups having communication spaces and conversations or other threads, it will be appreciated that the management may be performed for any collaboration, communication, or other sessions with respect to any types of groupings, sets, or collections. Further, a communication space may include any quantity of any types of communication or collaboration sessions and corresponding content (e.g., meetings, chats, conversations or other threads, forums, content, files, documents, messages, etc.). The communication space is typically presented on a display or user interface and enables a user to access and/or participate in the sessions of the communication space. Communication groups are listed hierarchically, but communication spaces themselves may not be hierarchical (e.g., each communication space may be its own entity, etc.). Communication groups make the hierarchy where communication spaces or 1:1 conversations are grouped. The communication space is associated with members (or teams of members) that are allowed access to the communication space.

In addition, a communication group may include any quantity of communication spaces and individual communication sessions (e.g., conversation or other threads between individuals, etc.), individually or in any combination. The communication group is typically presented on a display or user interface (e.g., analogous to a file or folder structure) and enables a user to access and/or participate in the communication spaces and individual communication sessions of the communication group.

Figure 1:
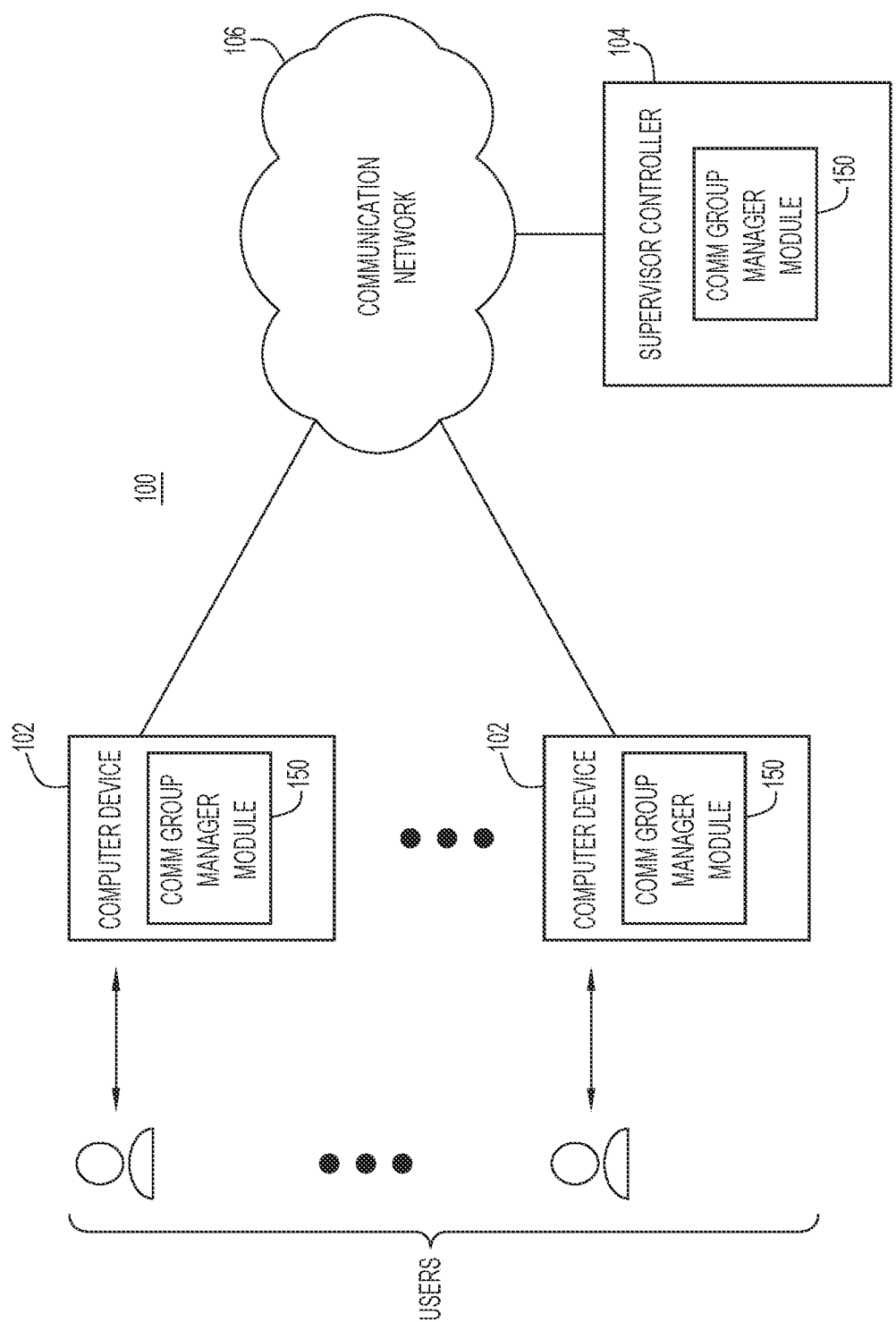
FIG. 1 is a block diagram of an example online communication environment in which management of communication groups may be implemented, according to an example embodiment.

FIG. 1 illustrates a block diagram of an example online communication or collaboration environment 100 in which an embodiment presented herein may be implemented.

Environment 100 includes multiple computer devices 102 (collectively referred to as computer devices, participant devices, or platforms) operated by local users/participants, a supervisor or server (also referred to as a "controller") 104 configured to support online (e.g., web-based or over-a-network) communication or collaborative sessions (e.g., meetings, chat, conversations or other threads, etc.) between the computer devices, and a communication network 106 communicatively coupled to the computer devices and the supervisor. Computer devices 102 can take on a variety of forms, including a smartphone, tablet, laptop computer, desktop computer, video conference endpoint, and the like.

Communication network 106 may include one or more wide area networks (WANs), such as the Internet, and one or more local area networks (LANs). Computer devices 102 may communicate with each other, and with supervisor 104, over communication network 106 using a variety of known or hereafter developed communication protocols. For example, the computer devices 102 and supervisor 104 may exchange Internet Protocol (IP) data packets, Realtime Transport Protocol (RTP) media packets (e.g., audio and video packets), and so on.

Computer devices 102 may each host a communication or collaboration application used to establish/join online communication or collaboration sessions and a communication group manager module 150. According to embodiments presented herein, communication group manager module 150 of the computer device enables arrangement and placement of communication spaces within communication groups as described below. In an embodiment, supervisor 104 or other server system coupled to communication network 106 may host communication group manager module 150 to arrange and place communication spaces within communication groups in substantially the same manner described below. In this case, communication groups, communication spaces, and individual (e.g., one-on-one, etc.) communication sessions of a user of a computer device 102 may be provided to communication group manager module 150 on supervisor 104 for processing.

Figure 2:
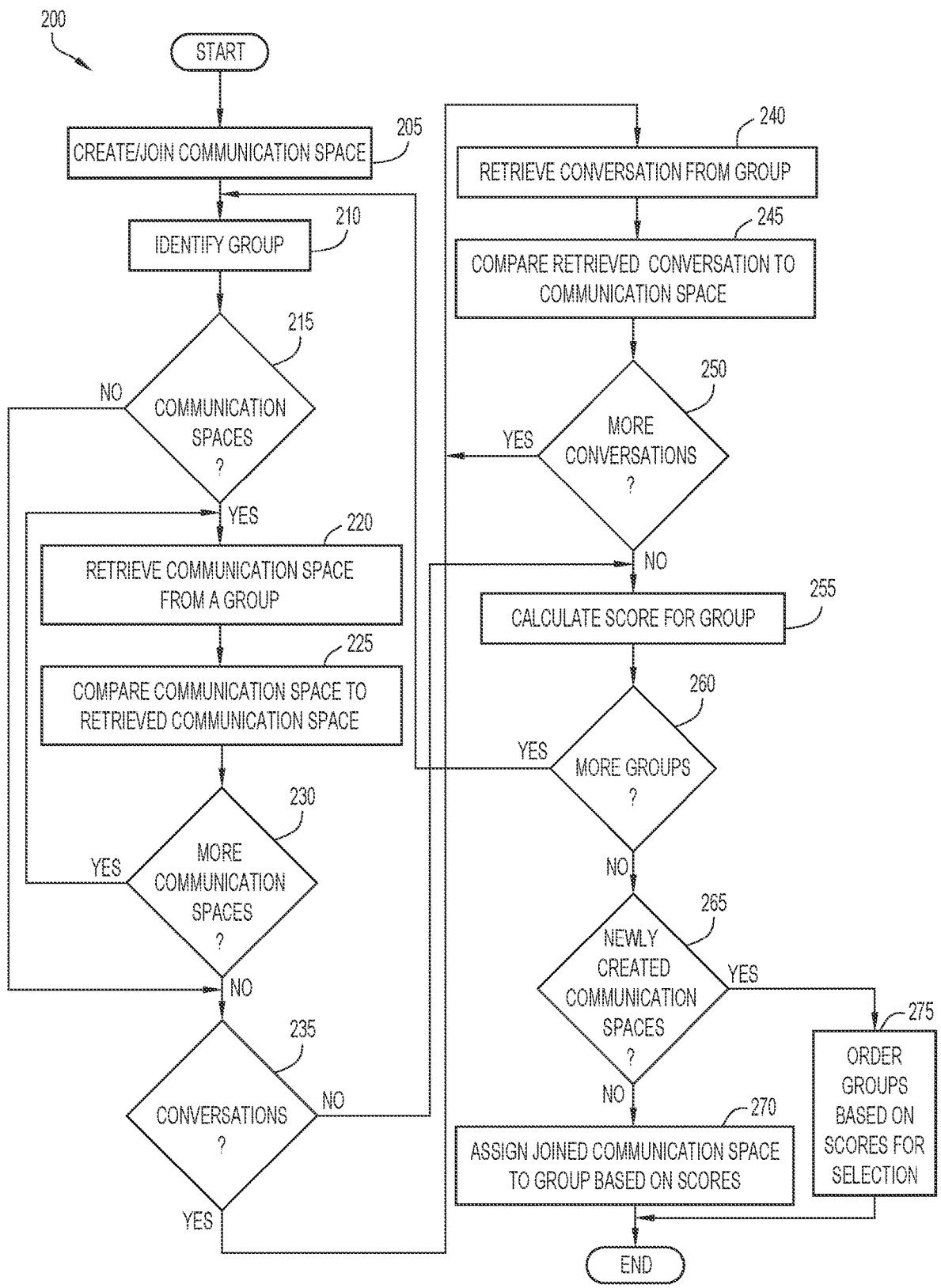
FIG. 2 illustrates a flowchart of a method for placing a communication space in a communication group, according to an example embodiment.

With continued reference to FIG. 1, FIG. 2 illustrates an example flowchart of a method 200 for placing a communication space in a communication group according to an example embodiment. Initially, a user may have a set of communication spaces and communication groups previously established. Since creating new communication groups based on a title and members of a communication space would produce random results, an example embodiment suggests to the user an existing communication group to contain a new communication space. This is based on a combination of factors, such as a title of the new communication space, users added to the new communication space, and characteristics of existing communication groups.

Further, a user may be invited to join an existing communication space. When a user is invited to join a communication space, the communication space may be automatically placed in a residual or catch-all communication group, or may not be grouped at all. When the user desires the communication space to be in a specific communication group, the user needs to manually place the communication space in the specific communication group.

Accordingly, an example embodiment considers the name of the communication space and the communication space members to match a communication space to a communication group. However, relative to a newly created communication space (with limited or no content), there should be more information available for this matching for the communication space to join since this communication space already exists with content which can also be used to match with existing communication spaces in communication groups. In this case, the content of the communication space or conversation of a communication group (as well as the previous factors described above for a new communication space (e.g., name and members)) are compared with those of the communication space to join. The weight of the content factor typically is greater than the other factors because the content is richer.

A user may create a communication space or join a communication space at operation 205. A communication group of the user is identified at operation 210 for evaluation with respect to determining a corresponding communication group for the communication space. Communication groups preferably include existing communication spaces associated with titles or names, members, content, and/or one-on-one (1:1) or other conversations or threads with individuals. In order to determine a corresponding communication group for the communication space, the example embodiment traverses through each communication group of the user including the corresponding communication spaces and one-on-one conversations or other threads of that communication group.

When the identified communication group includes one or more communication spaces as determined at operation 215, the communication spaces are evaluated. In particular, a communication space of the identified communication group is retrieved at operation 220, and compared to the communication space at operation 225. The comparison may include comparing various attributes between the communication space and the retrieved communication space (e.g., the names of the communication spaces, the members of the communication spaces, the content of the communication spaces, etc.). The comparisons produce a score indicating relevancy or similarity of the corresponding attributes. The process continues until each of the communication spaces in the identified communication group have been processed as determined at operation 230.

When no communication spaces are present or have been processed as determined at operations 215 or 230, conversations or other threads within the identified communication group are evaluated. When the identified communication group includes one or more conversations (e.g., one-on-one conversations, etc.) as determined at operation 235, the conversations are evaluated. In particular, a conversation of the identified communication group is retrieved at operation 240, and compared to the communication space at operation 245. The comparison may include comparing various attributes between the communication space and the retrieved conversation (e.g., the theme and/or content of the conversation, the members of the communication space and conversation, the content of the communication space and conversation, etc.). The comparisons produce a score indicating relevancy or similarity of the corresponding attributes. The process continues until each of the conversations in the identified communication group have been processed as determined at operation 250.

When the communication spaces and conversations of the identified communication group have been processed as determined at operations 235 or 250, an overall score for the identified communication group is determined at operation 255 based on the similarity scores of the communication spaces and conversations of the identified communication group. The similarity scores may be combined in any fashion (e.g., summed, averaged, etc.) to produce the overall score. In addition, the similarity scores may be weighted to produce the overall score (e.g., weighted sum, weighted average, etc.). The above process is repeated from operation 210 until an overall score is produced for each communication group of the user as determined at operation 260.

When the user joined an existing communication space (at operation 205) as determined at operation 265, the communication space is assigned to a communication group based on the overall scores (e.g., the communication group with the greatest overall score, etc.) at operation 270. The communication space may be automatically added to the communication group when the similarity of the factors (e.g., individual scores or the overall score) exceeds or otherwise satisfies a threshold. The threshold may be configurable. The addition of the communication space may be indicated by a visual cue or indicator (e.g., symbol, font change, etc.) on a display or user interface (e.g., in substantially the same manner described below for FIG. 9). An added communication space (indicated by a visual cue) may be removed from the communication group by actuating an actuator on the display or user interface (e.g., in substantially the same manner described below for FIG. 9). For example, this may be used in cases where content is machine generated and, therefore, the content is very similar to content of other similar communication spaces.

The communication group may be presented and accessed on a user interface (e.g., as described below for FIG. 9) along with other communication groups, where the communication space is shown as belonging to the communication group. The communication space may be accessed from the communication group for access and/or participation (e.g., posting, reading, etc.) in a communication session of the communication space.

When the communication space is a new communication space created by the user (at operation 205) as determined at operation 265, a list of one or more recommended communication groups is presented on a display or user interface for selection at operation 275 (e.g., as described below for FIG. 3). The list may be ordered (e.g., in ascending or descending order, etc.) based on the overall scores. The new communication space is assigned to a communication group selected by the user from the list. This option may be performed to follow a flow of creating something. In addition, in the case of a new communication space, there is less information available and, therefore, the determination may be wrong more often than when an individual joins a communication space where there is content in that space already. The communication group may be presented and accessed on a user interface (e.g., as described below for FIG. 9), where the new communication space is shown as belonging to the communication group. The new communication space may be accessed from the communication group for access and/or participation (e.g., posting, reading, etc.) in a communication session of the new communication space.

Figure 3:
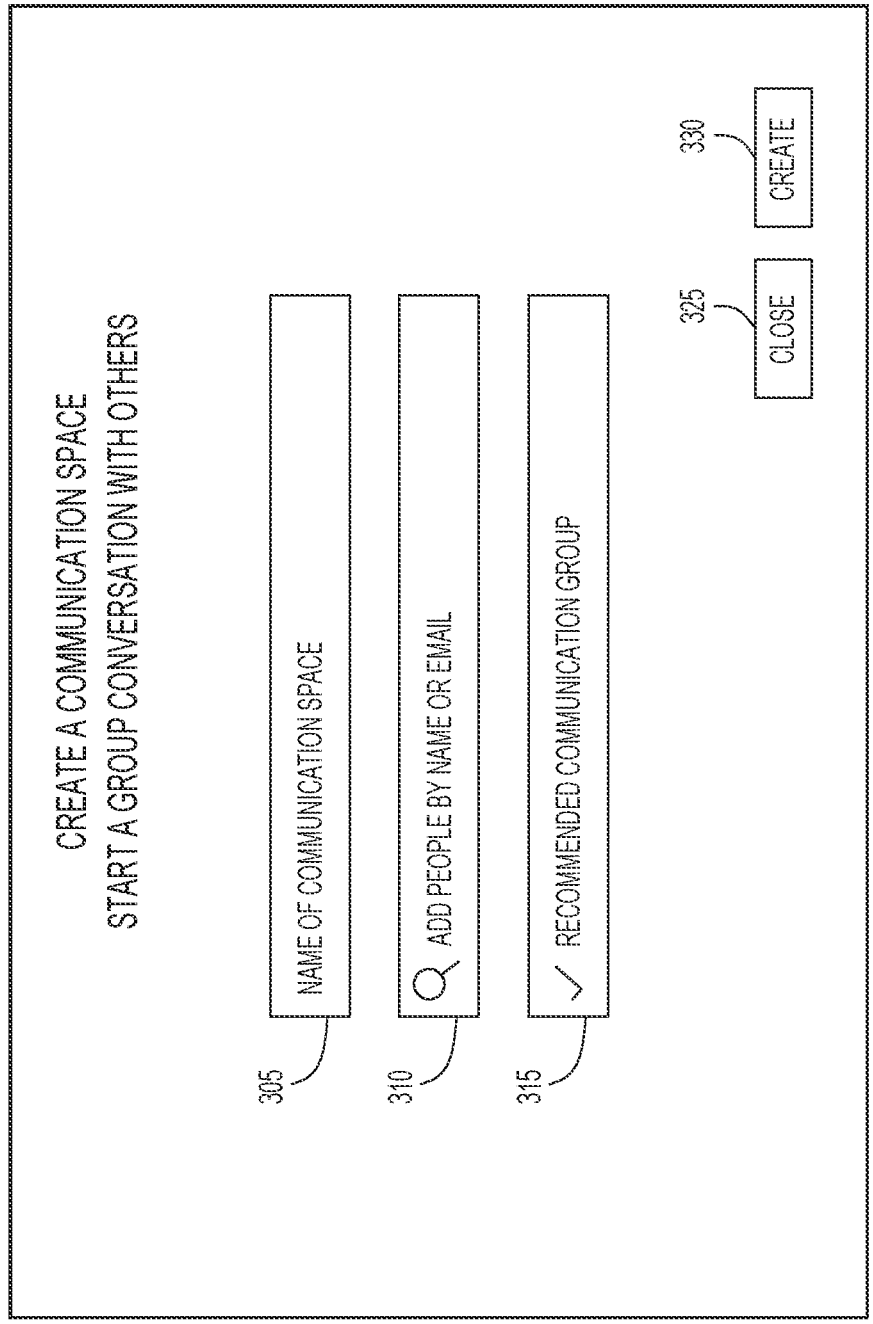
FIG. 3 illustrates a user interface for creating a communication space and recommending a communication group, according to an example embodiment.
Figure 4:
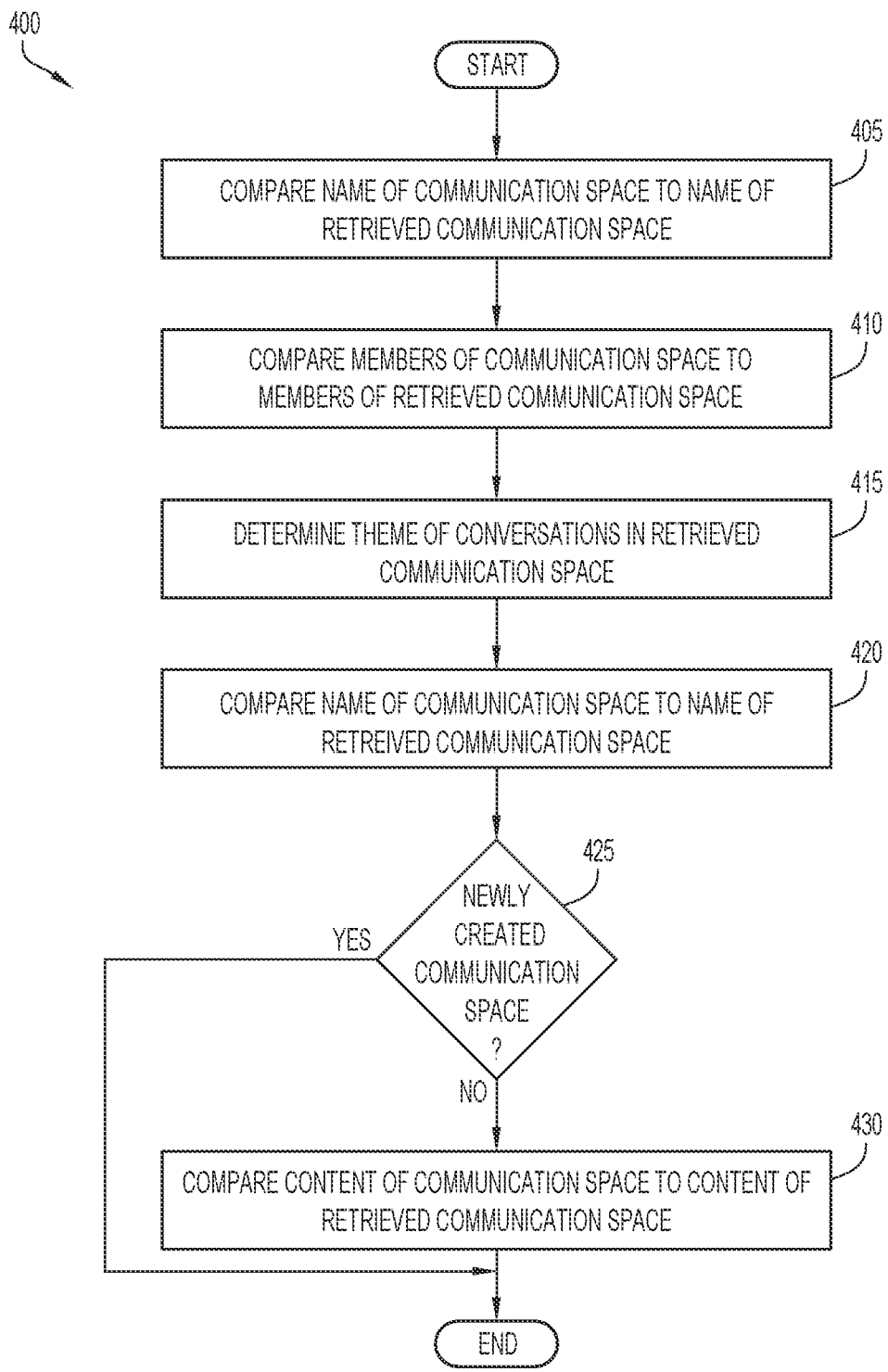
FIG. 4 is a flowchart of a method for evaluating a communication space relative to a communication space of a communication group, according to an example embodiment.
Figure 5:
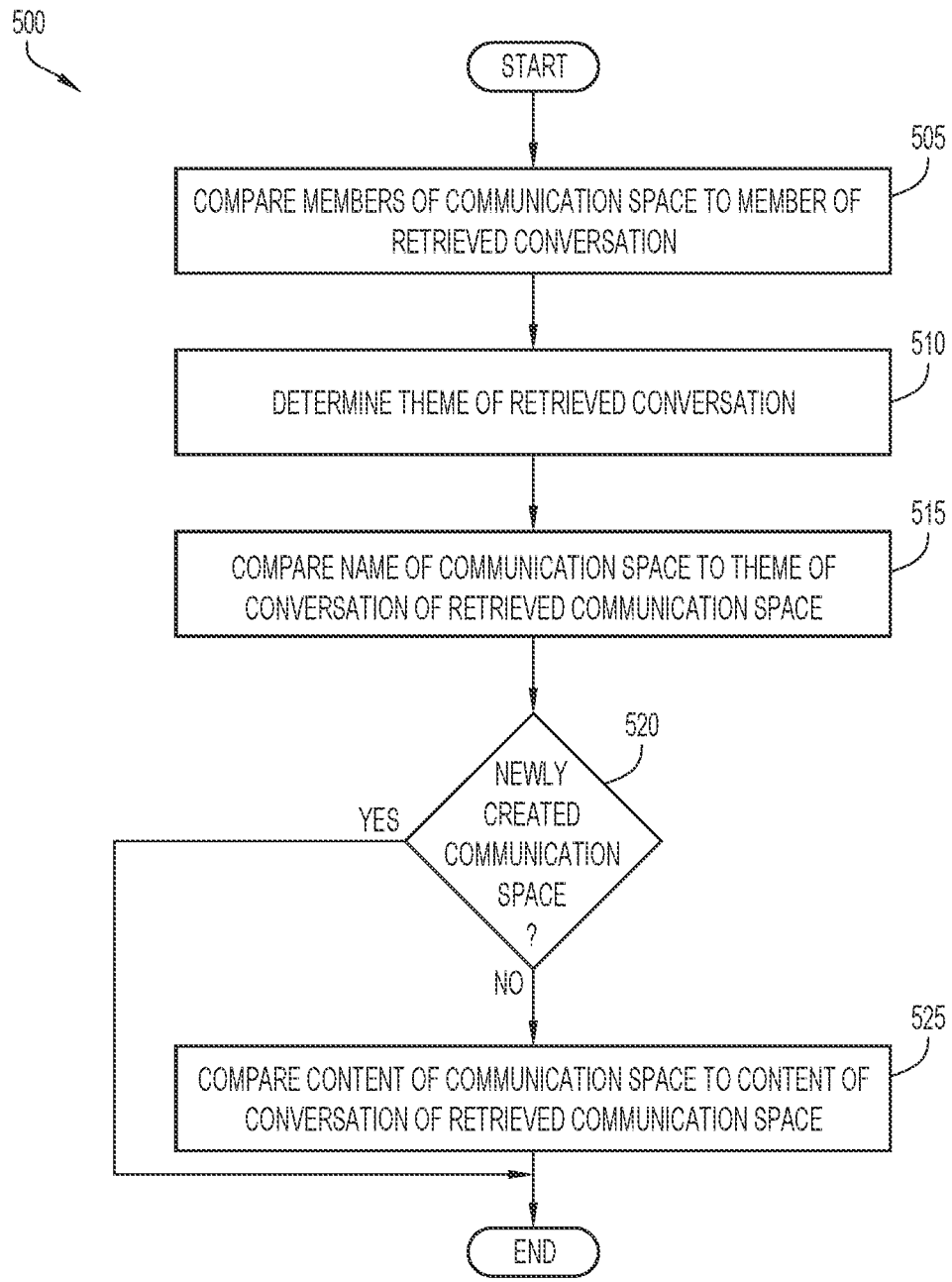
FIG. 5 is a flowchart of a method for evaluating a communication space relative to conversations of a communication group, according to an example embodiment.
Figure 6:
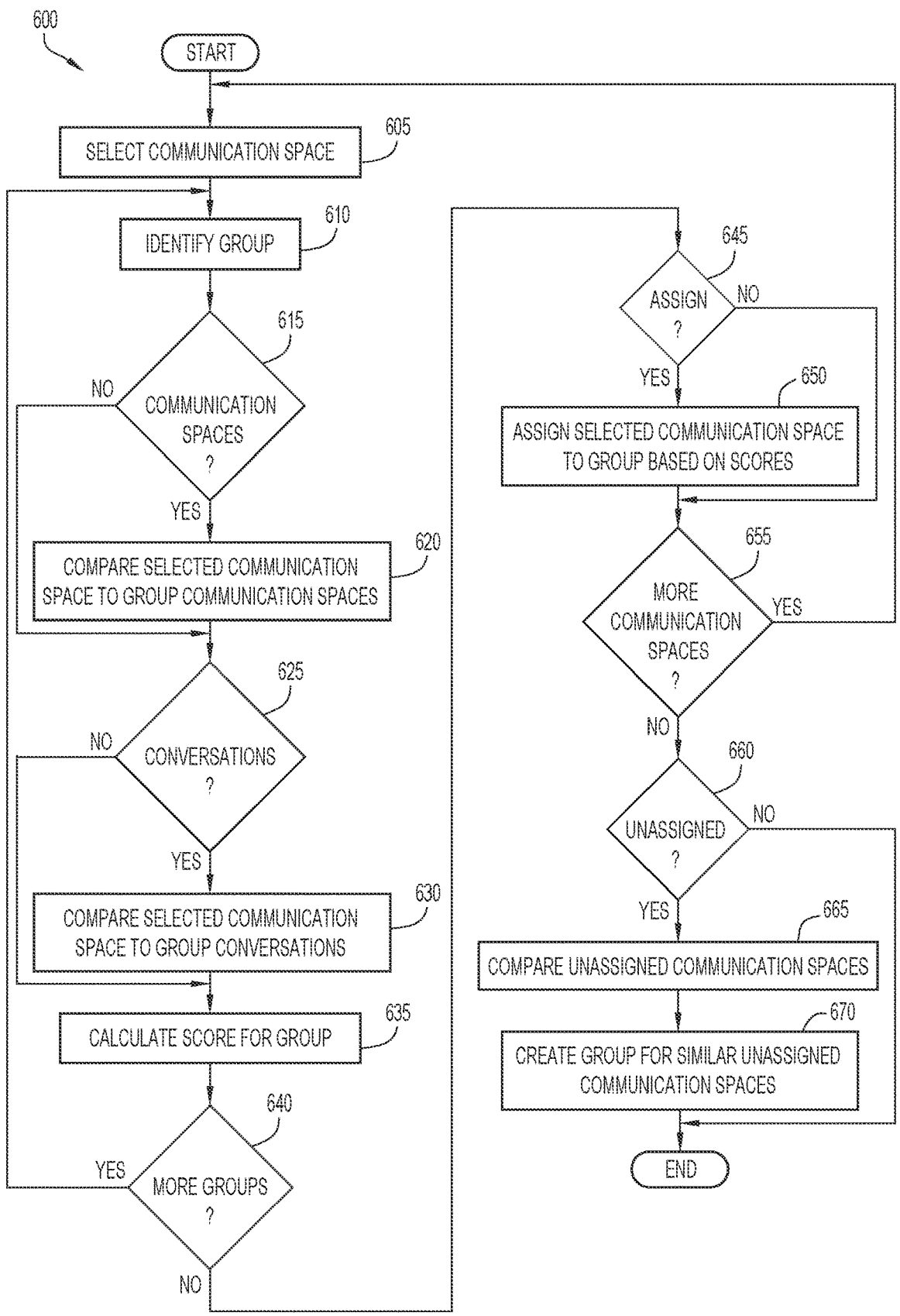
FIG. 6 is a flowchart of a method of placing communication spaces into communication groups, according to an example embodiment.

With continued reference to FIGS. 1 and 2, FIG. 3 illustrates a user interface 300 for creating a communication space and recommending a communication group according to an example embodiment. Interface 300 includes a name field 305, a member field 310, and a recommendation field 315. Name field 305 receives a name or title for the new communication space, while member field 310 receives one or more users to be members of the communication space. The users may be indicated by various attributes (e.g., name, e-mail address, handle, etc.). Further, interface 300 includes a close or cancel actuator 325, and a create actuator 330.

A user provides communication space information (e.g., name, members, public/private indication, etc.) in corresponding fields 305 and 310. The entered communication space information is compared to communication groups of the user in substantially the same manner described herein to determine recommended communication groups for the new communication space. The quality of the recommendation increases as the length of the name and the number of users added to the communication space increases since greater information is available for the communication group comparisons. The recommended communication groups are provided in recommendation field 315 for selection by the user (e.g., a drop-down list, etc.). The user may actuate create actuator 330 after selection of the communication group to enable creation of the new communication space. The new communication space is assigned to the selected communication group. A user may alternatively cancel communication space creation by actuating close actuator 325.

With continued reference to FIGS. 1-3, FIG. 4 illustrates a flowchart of a method 400 for evaluating a communication space relative to a communication space of a communication group according to an example embodiment. This may correspond to operation 225 of FIG. 2. Initially, a user may create or join a communication space, and a communication space of a communication group may be retrieved for evaluation as described above. The name or title of the communication space is compared to the name of the retrieved communication space at operation 405. This may be accomplished by performing a pattern match of the names of the communication spaces, direct character comparison, artificial intelligence (AI) to determine semantic matching, etc. A weight may be assigned and applied to a value of the pattern match or character comparison (e.g., a higher value for a pattern match or greater degree of similarity or overlap, etc.) to determine a (weighted) score for the name attribute.

The members of the communication space are compared with members of the retrieved communication space at operation 410. This may be accomplished by determining a level of overlap between the members (e.g., the quantity of members in common between the communication space and the retrieved communication space, etc.). A weight may be assigned and applied to the level of overlap (e.g., a higher value for a greater number of common members, etc.) to determine a weighted score for the member attribute.

A theme of conversations or other threads in the retrieved communication space is determined at operation 415. This may be accomplished using any conventional or other natural language processing techniques and/or machine learning models. The natural language processing techniques may include various techniques (e.g., entity recognition, relationship discovery, semantic analysis, sentiment analysis, part-of-speech (POS) tagging, etc.) to determine a theme of the conversations or threads. The machine learning models may include any conventional or other machine learning models (e.g., mathematical/statistical, classifiers, feed-forward, recurrent, convolutional, deep learning, or other neural networks, etc.).

By way of example, a large language model (LLM) may be employed to determine a theme of the conversations or threads. The LLM includes a neural network that is trained on a vocabulary of text, and produces probabilities across the vocabulary (e.g., one or more words, etc.) to indicate results. For example, neural networks may include an input layer, one or more intermediate layers (e.g., including any hidden layers), and an output layer. Each layer includes one or more neurons, where the input layer neurons receive input (e.g., text or text features, etc.), and may be associated with weight values. The neurons of the intermediate and output layers are connected to one or more neurons of a preceding layer, and receive as input the output of a connected neuron of the preceding layer. Each connection is associated with a weight value, and each neuron produces an output based on a weighted combination of the inputs to that neuron. The output of a neuron may further be based on a bias value for certain types of neural networks (e.g., recurrent types of neural networks).

The weight (and bias) values may be adjusted based on various training techniques. For example, the machine learning of the neural network may be performed using a training set of various text as input and corresponding desired outputs (e.g., themes, etc.), where the neural network attempts to produce the provided output and uses an error from the output (e.g., difference between produced and known outputs) to adjust weight (and bias) values (e.g., via backpropagation or other training techniques).

The output layer neurons may indicate a probability for the input data being associated with a corresponding output (e.g., associated with one or more words of the vocabulary). The output with the highest probability may be selected as the theme. The text of the conversation or other thread is provided to the large language model (LLM) to produce the theme.

The theme is compared to the name of the communication space to determine similarity or a match at operation 420. This may be accomplished by performing a pattern match of the name of the communication space and the theme, direct comparison of characters, artificial intelligence (AI) to determine semantic matching, etc. A weight may be assigned and applied to a value of the pattern match or character comparison (e.g., a higher value for a pattern match or greater degree of similarity or overlap, etc.) to determine a (weighted) score for the theme attribute.

When the communication space is joined (e.g., not newly created) as determined at operation 425, the content of the communication space is compared to the content of the retrieved communication space at operation 430. Since the communication space to join already exists, additional information is available for the comparison (e.g., content of the sessions and threads, etc.). The content comparison may be accomplished using any conventional or other natural language processing techniques and/or machine learning models. The natural language processing techniques may include various techniques (e.g., entity recognition, relationship discovery, semantic analysis, sentiment analysis, part-of-speech (POS) tagging, TF-IDF or other metrics, etc.) to compare the content of the communication spaces (e.g., text, data, objects, documents, meta-data, attributes, or other information from sessions, conversations or threads, etc.). The machine learning models may include any conventional or other machine learning models (e.g., mathematical/statistical, classifiers, feed-forward, recurrent, convolutional, deep learning, or other neural networks, etc.). By way of example, a large language model (LLM) may be employed to compare the content and produce a similarity value. The LLM includes a neural network that is trained on a vocabulary of text, and produces probability or similarity values to indicate results in substantially the same manner described above.

The sessions and conversations or threads of the communication spaces may be compared individually or in any combinations to determine similarity values that may be combined (e.g., summed, averaged, etc.) to produce a value for the content similarity. Alternatively, the entire content of the communication spaces may be compared to produce the value for the content similarity. A weight may be assigned and applied to the value of the content comparison (e.g., a higher value for a match or greater degree of similarity, etc.) to determine a (weighted) score for the content attribute.

The communication spaces of each communication group are compared to the communication space to determine the weighted attribute scores for the communication group. The attribute scores for communication spaces and conversations of the communication group are combined (e.g., summed, averaged, etc.) to produce the overall score for the communication group as described above. The weights for the attributes may be in any desired range, and may be assigned in any fashion based on significance of an attribute.

With continued reference to FIGS. 1-4, FIG. 5 illustrates is a flowchart of a method 500 for evaluating a communication space relative to conversations of a communication group according to an example embodiment. This may correspond to operation 245 of FIG. 2. Initially, a user may create or join a communication space, and a conversation (e.g., 1:1 conversation, etc.) of a communication group may be retrieved for evaluation in substantially the same manner as described above. The members of the communication space are compared with the member of the retrieved conversation (e.g., the other person in the retrieved conversation with the user, etc.) at operation 505. This may be accomplished by determining a match between the members (e.g., a match of members in the communication space to the member of the retrieved conversation, etc.). A weight may be assigned and applied to the matching (e.g., a higher value for a match, etc.) to determine a weighted score for the member attribute.

A theme of the retrieved conversation is determined at operation 510. This may be accomplished using any conventional or other natural language processing techniques and/or machine learning models in substantially the same manner described above. The natural language processing techniques may include various techniques (e.g., entity recognition, relationship discovery, semantic analysis, sentiment analysis, part-of-speech (POS) tagging, etc.) to determine a theme of the retrieved conversation or thread. The machine learning models may include any conventional or other machine learning models (e.g., mathematical/statistical, classifiers, feed-forward, recurrent, convolutional, deep learning, or other neural networks, etc.). By way of example, a large language model (LLM) may be employed to determine a theme of the conversation or thread in substantially the same manner described above.

The theme is compared to the name of the communication space to determine similarity or a match at operation 515. This may be accomplished by performing a pattern match of the name of the communication space and theme, direct comparison of characters, artificial intelligence (AI) to determine semantic matching, etc. A weight may be assigned and applied to a value of the pattern match or character comparison (e.g., a higher value for a match or greater degree of similarity, etc.) to determine a (weighted) score for the theme attribute.

When the communication space is joined (e.g., not newly created) as determined at operation 520, the content of the communication space is compared to the content of the retrieved conversation at operation 525. Since the communication space to join already exists, additional information is available for the comparison (e.g., content of the sessions and threads, etc.). The content comparison may be accomplished using any conventional or other natural language processing techniques and/or machine learning models in substantially the same manner described above. The natural language processing techniques may include various techniques (e.g., entity recognition, relationship discovery, semantic analysis, sentiment analysis, part-of-speech (POS) tagging, TF-IDF or other metrics, etc.) to compare the content of the communication space (e.g., text, data, objects, documents, meta-data, attributes, or other information from sessions, conversations or threads, etc.) and the retrieved conversation. The machine learning models may include any conventional or other machine learning models (e.g., mathematical/statistical, classifiers, feed-forward, recurrent, convolutional, deep learning, or other neural networks, etc.). By way of example, a large language model (LLM) may be employed to compare the content and produce a similarity value in substantially the same manner described above. A weight may be assigned and applied to a value of the content comparison (e.g., a higher value for a match or greater degree of similarity, etc.) to determine a (weighted) score for the content attribute.

The conversations of each communication group are compared to the communication space to determine the weighted attribute scores for conversations of the communication group. The attribute scores for communication spaces and conversations are combined (e.g., summed, averaged, etc.) to produce the overall score for the communication group as described above. The weights for the attributes may be in any desired range, and may be assigned in any fashion based on significance of an attribute.

A user may have many communication spaces that are not in communication groups. The job of placing the communication spaces in appropriate communication groups can be arduous. Accordingly, an example embodiment provides a computerized wizard (or agent), where the communication space name, members, and content are evaluated to determine whether a communication space belongs to an existing communication group. If a collection of communication spaces have similar names, members, and/or content, but there is no corresponding communication group, then creation of a new communication group is recommended and a suitable name is suggested using any conventional or other generative artificial intelligence (AI) techniques. When all the communication spaces have been processed, a user interface of the wizard is presented to the user showing the suggestions. The user is allowed to accept or modify the recommendation and suggestions (e.g., as described below for FIG. 7).

With continued reference to FIGS. 1-5, FIG. 6 is a flowchart of a method 600 of placing communication spaces into communication groups according to an example embodiment. Initially, a user may have communication spaces and communication groups, where one or more of the communication spaces may not be assigned to communication groups. Accordingly, the example embodiment processes the unassigned or isolated communication spaces to determine corresponding communication groups, and may create a new communication group for a collection of unassigned communication spaces having similar attributes. In particular, an unassigned communication space of the user may be selected at operation 605. A communication group of the user is identified at operation 610 for evaluation with respect to determining a corresponding communication group for the selected communication space. Communication groups preferably include existing communication spaces associated with titles or names, members, content, and/or one-on-one (1:1) or other conversations or threads. In order to determine a corresponding communication group for the selected communication space, the example embodiment traverses through each communication group of the user including the corresponding communication spaces and one-on-one conversations of that communication group.

When the identified communication group includes one or more communication spaces as determined at operation 615, each of the communication spaces of the identified group are evaluated relative to the selected communication space at operation 620. The evaluation may include comparing various attributes between the selected communication space and each communication space of the identified group (e.g., the names of the communication spaces, the members of the communication spaces, the content of the communication spaces, etc.) in substantially the same manner described above (e.g., for FIGS. 2 and 4). The comparisons produce a (weighted) score indicating relevancy or similarity of the corresponding attributes as described above.

Once the communication spaces in the identified communication group have been processed, conversations within the identified communication group are evaluated. When the identified communication group includes one or more conversations (e.g., one-on-one conversations, etc.) as determined at operation 625, each of the conversations of the identified communication group are evaluated at operation 630. The evaluation may include comparing various attributes between the selected communication space and the conversations of the identified communication group (e.g., the theme and/or content of the conversations, the members of the selected communication space and conversations, the content of the selected communication space and conversations, etc.) in substantially the same manner described above (e.g., for FIGS. 2 and 5). The comparisons produce a (weighted) score indicating relevancy or similarity of the corresponding attributes as described above.

Once the communication spaces and conversations of the identified communication group have been processed, an overall score for the identified communication group is determined at operation 635. This may be accomplished by combining (e.g., sum, average, etc.) the attribute scores for communication spaces and conversations (e.g., summed, averaged, etc.) to produce the overall score for the identified communication group in substantially the same manner described above. The weights for the attributes may be in any desired range, and may be assigned in any fashion based on significance of an attribute. The above process is repeated from operation 610 until an overall score is produced for each communication group of the user as determined at operation 640.

The overall scores are analyzed at operation 645. When the overall scores are sufficient to assign the selected communication space (e.g., overall scores exceed or otherwise satisfy a threshold, etc.), the communication space is assigned to a corresponding communication group based on the scores (e.g., highest score satisfying a threshold value, etc.) at operation 650. The selected communication group may remain unassigned when the scores are insufficient (e.g., overall scores below or otherwise failing to satisfy the threshold, etc.) to indicate a corresponding communication group.

The above process is repeated from operation 605 until the communication spaces of the user have been processed as determined at operation 655. When one or more communication spaces are unassigned to a corresponding communication group as determined at operation 660, the unassigned communication groups are evaluated at operation 665. The evaluation may include comparing various attributes between the unassigned communication spaces (e.g., the names of the communication spaces, the members of the communication spaces, the content of the communication spaces, etc.) in substantially the same manner described above (e.g., for FIGS. 2, 4, and 5). One or more communication groups may be created for communication spaces with similar attributes at operation 670. Similar communication spaces for creation of a communication group may be determined based on the attribute scores from the comparisons (e.g., a quantity of attribute scores exceeding or otherwise satisfying a threshold, an overall score determined from a combination (e.g., sum, average, etc.) of the attribute scores exceeding or otherwise satisfying a threshold, etc.). Alternatively, various conventional or other clustering techniques (e.g., k-nearest neighbor, hierarchical, etc.) may be used to cluster unassigned communication spaces, where a communication group may be created for communication spaces in each cluster.

In addition, names may be suggested for the created communication groups using conventional or other generative artificial intelligence (AI) techniques based on the attributes (e.g., names, content, etc.). For example, any conventional or other machine learning models (e.g., mathematical/statistical, classifiers, feed-forward, recurrent, convolutional, deep learning, or other neural networks, etc.) may be employed to determine a name for a communication group. By way of example, a large language model (LLM) may be employed to evaluate content of communication spaces of the created communication group and produce a name in substantially the same manner described above. The LLM may include a neural network that is trained on a vocabulary of text, and produces probabilities across the vocabulary (e.g., one or more words, etc.) to indicate results. The output layer neurons may indicate a probability for the input data being associated with a corresponding output (e.g., associated with one or more words of the vocabulary). The output with the highest probability may be selected as the name. The text of the communication spaces of the created communication group is provided to the large language model (LLM) to produce the name. The resulting communication spaces and names may be presented on a user interface for selection or modification by the user as described below (e.g., for FIG. 7).

The communication groups resulting from the selection or modification may be presented and accessed on a user interface (e.g., as described below for FIG. 9) along with other communication groups, where communication spaces are shown as belonging to the communication groups. The communication spaces may be accessed from the communication groups for access and/or participation (e.g., posting, reading, etc.) in a communication session of the communication spaces.

Figure 7:
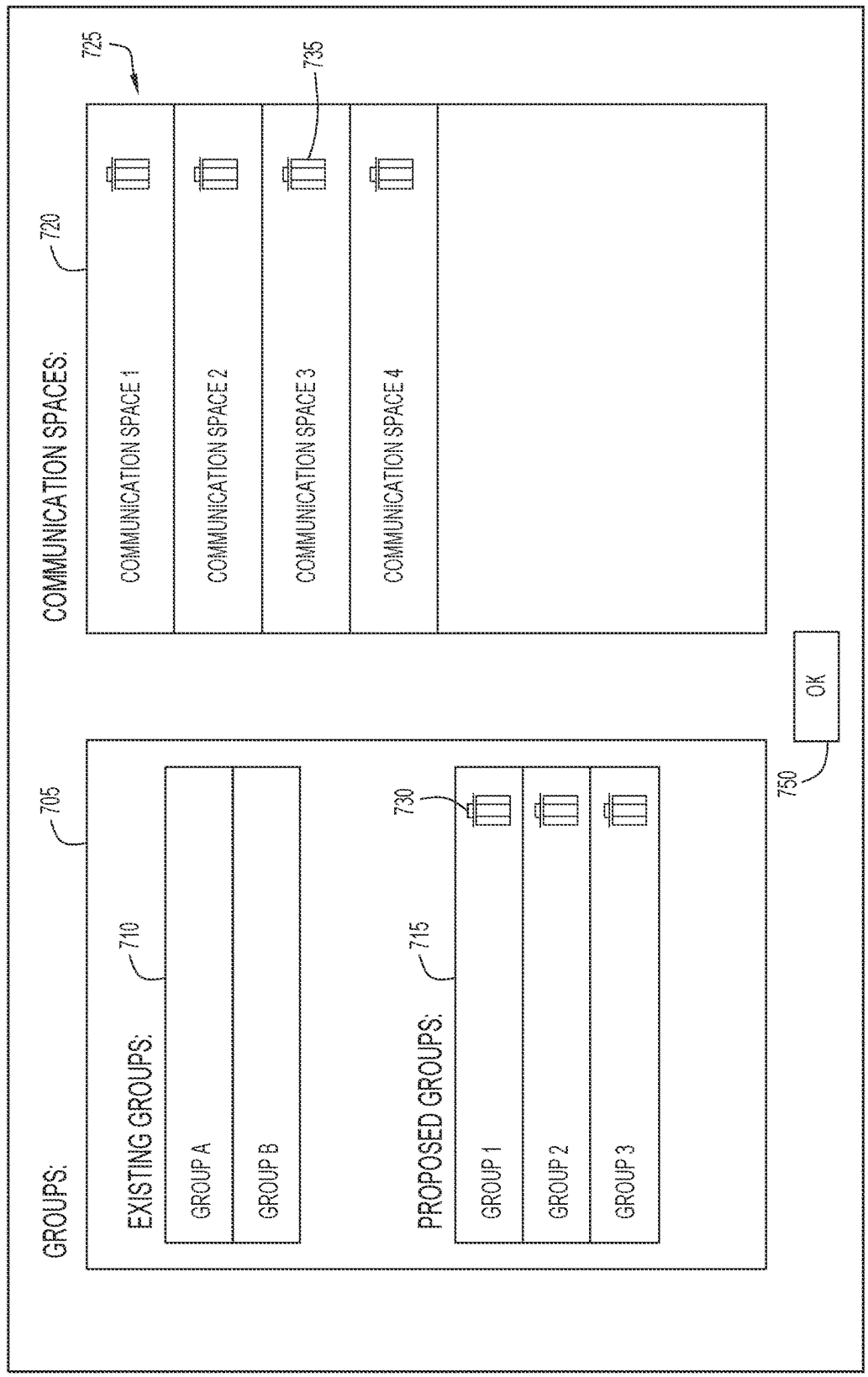
FIG. 7 is a user interface for placing communication spaces into communication groups, according to an example embodiment.
Figure 8:
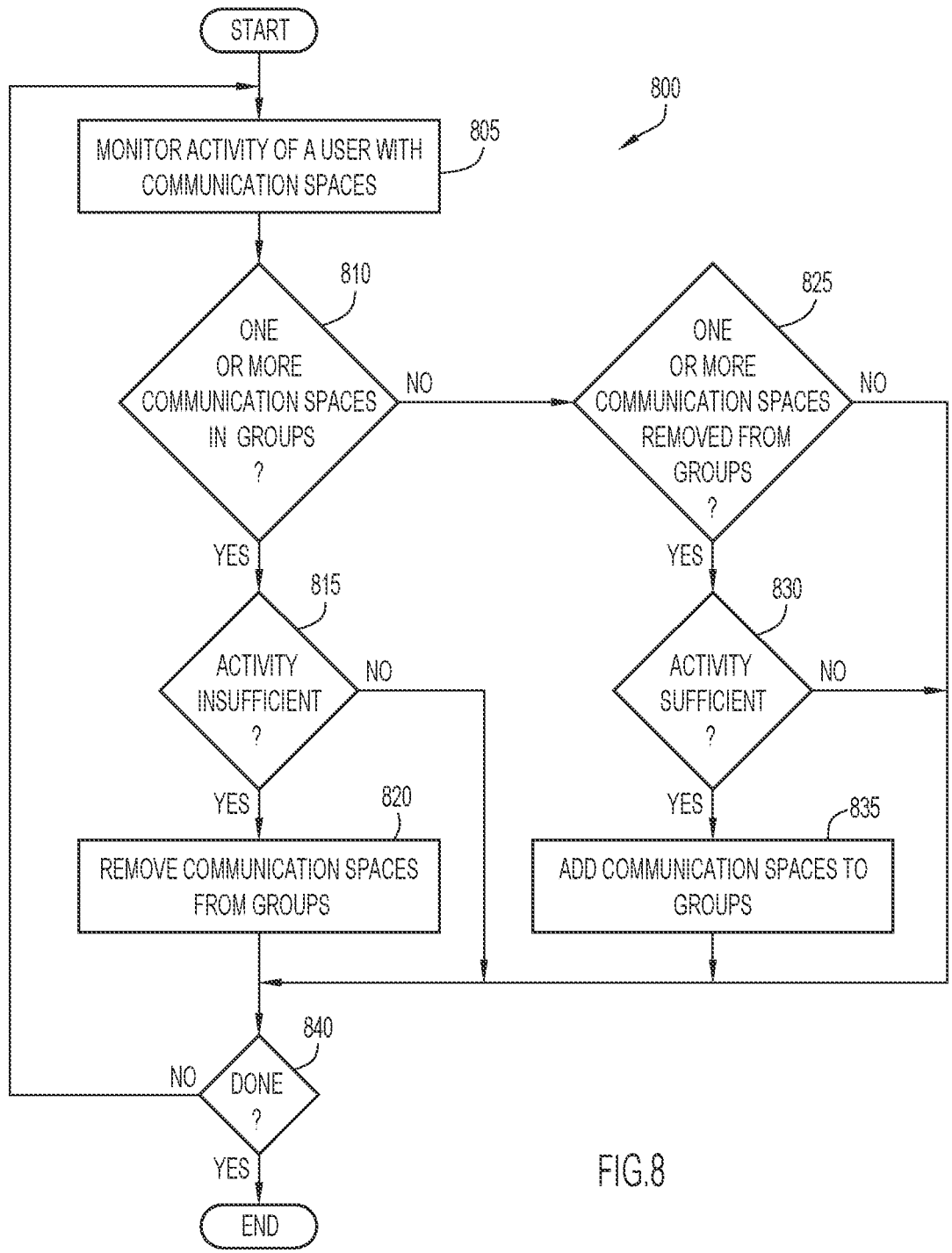
FIG. 8 is a flowchart of a method for managing communication groups based on user activity, according to an example embodiment.

With continued reference to FIGS. 1-6, FIG. 7 is a user interface 700 for placing communication spaces into communication groups according to an example embodiment. Interface 700 includes a communication group area 705 and a communication space area 720. Communication group area 705 includes existing communication group fields 710 and proposed communication group fields 715. Existing group fields 710 display existing communication groups (e.g., Group A and Group B as shown in FIG. 7). The existing communication groups are those that were created by the user, or joined by the user and created by another (e.g., system, other users, etc.). Proposed group fields 715 display proposed or recommended communication groups for creation (e.g., Group 1, Group 2, and Group 3 as shown in FIG. 7). Proposed group fields 715 each include a delete actuator 730 to remove or delete a corresponding proposed group.

Communication space area 720 includes communication space fields 725 for displaying communication spaces (e.g., Communication Space 1, Communication Space 2, Communication Space 3, and Communication Space 4 as shown in FIG. 7). The list of communication spaces corresponds to the communication group selected (e.g., clicked on, etc.) by a user in communication group area 705 (e.g., Group A). Communication space fields 725 each include a delete actuator 735 to remove or delete a corresponding communication space. In addition, interface 700 includes an actuator 750 to initiate or process selections on the user interface (e.g., assign communication spaces to communication groups, etc.).

The system may process communication spaces of a user as described above and display the results (e.g., existing and proposed communication groups, etc.) in corresponding existing group fields 710 and proposed group fields 715. The user may select a communication group (e.g., Group A), and the interface displays the corresponding communication spaces for the selected communication group in communication space fields 725 (e.g., Communication Space 1, Communication Space 2, Communication Space 3, and Communication Space 4 as shown in FIG. 7). Further, the user may delete a proposed communication group by actuating a corresponding delete actuator 730, or rename the proposed communication group (e.g., clicking on the communication group name and entering a new name, etc.).

The communication spaces displayed on interface 700 include pre-existing communication spaces within the selected communication group (e.g., Communication Space 1 and Communication Space 2), and proposed communication spaces to be added to the selected communication group based on the techniques of example embodiments described above (e.g., Communication Space 3 and Communication Space 4). The user can remove a communication space by actuating a corresponding delete actuator 735. In addition, the user may move (e.g., drag and drop) the communication spaces into any of the communication groups to re-arrange the communication spaces among the communication groups. Once the desired modifications have been entered, the user may actuate actuator 750 to process the modifications.

As a user is added to, or creates more communication spaces within communication groups, the value of communication groups becomes less useful. For example, if a communication group has numerous communication spaces, the point of the communication group diminishes since a desired communication space may be difficult to locate. Accordingly, an example embodiment continuously reviews activity and interactivity of the user with communication spaces within communication groups to maintain relevant communication spaces within the communication groups.

With continued reference to FIGS. 1-7, FIG. 8 is a flowchart of a method 800 for managing communication groups based on user activity according to an example embodiment. Initially, a user may have several communication groups with communication spaces therein. Activity of a user with respect to communication spaces is monitored at operation 805. For example, an activity may be tracked to produce various metrics or activity information. By way of example, the activity information may include user dwell time and scroll pattern within a communication space, message read patterns, message responses/posts, content re-read, attachment previews, or any other activity information. In an embodiment, the monitoring may include gathering information for the communication space based on message read patterns, scroll patterns (e.g., scroll depth, scroll speed, etc.), dwell time, clicks (e.g., clicks, click through rate, etc.), skips, content sharing, forwarding of messages, responding to messages, re-read of messages, preview or download of content attachments, time spent in the communication space and/or conversations, or any combination of these or other activities by the user.

When one or more communication spaces of the user are assigned to one or more communication groups as determined at operation 810, the activity information is analyzed at operation 815. When the activity information indicates an insufficient amount of activity for one or more of the communication spaces as determined at operation 815, the communication spaces with insufficient activity are removed from their communication groups at operation 820. For example, the activity information or metrics may be compared to corresponding activity thresholds to determine an insufficient amount of activity (e.g., metrics below or otherwise failing to satisfy thresholds for dwell time, quantity of posts, quantity of reads, scroll metrics, etc.). Further, a lack of activity in the communication space or a lack of contribution or reading by the user in the communication space may indicate insufficient activity.

When one or more communication spaces of the user are unassigned to one or more communication groups as determined at operation 810, the unassigned communication spaces are evaluated for a prior assignment to a corresponding communication group. When one or more unassigned communication groups have been previously assigned to corresponding communication groups as determined at operation 825, the activity information is analyzed at operation 830. When the activity information indicates a sufficient amount of activity for one or more of the unassigned communication spaces as determined at operation 830, the communication spaces with sufficient activity are assigned or added back to those previously assigned communication groups at operation 835. For example, the activity information or metrics may be compared to corresponding activity thresholds to determine a sufficient amount of activity (e.g., metrics exceeding or otherwise satisfying thresholds for dwell time, quantity of posts, quantity of reads, scroll metrics, etc.). Further, any activity in the communication space or a contribution or reading by the user in the communication space may indicate sufficient activity.

The process is repeated from operation 805 to monitor user activity until termination of the process (e.g., power down, close of collaboration session or application, etc.) as determined at operation 840. The user may configure an amount of communication spaces that should reside in a communication group to initiate the process (e.g., one or more communication groups need to include a number of communication spaces in excess of the configured amount in order to initiate the process, etc.). Further, the process may be performed for all or any portion of the communication groups and communication spaces. In addition, the addition and removal of communication spaces within communication groups may be configurable to automatically enable or disable these operations (e.g., configurable threshold, enable/disable removal and addition of communication spaces, etc.).

Figure 9:
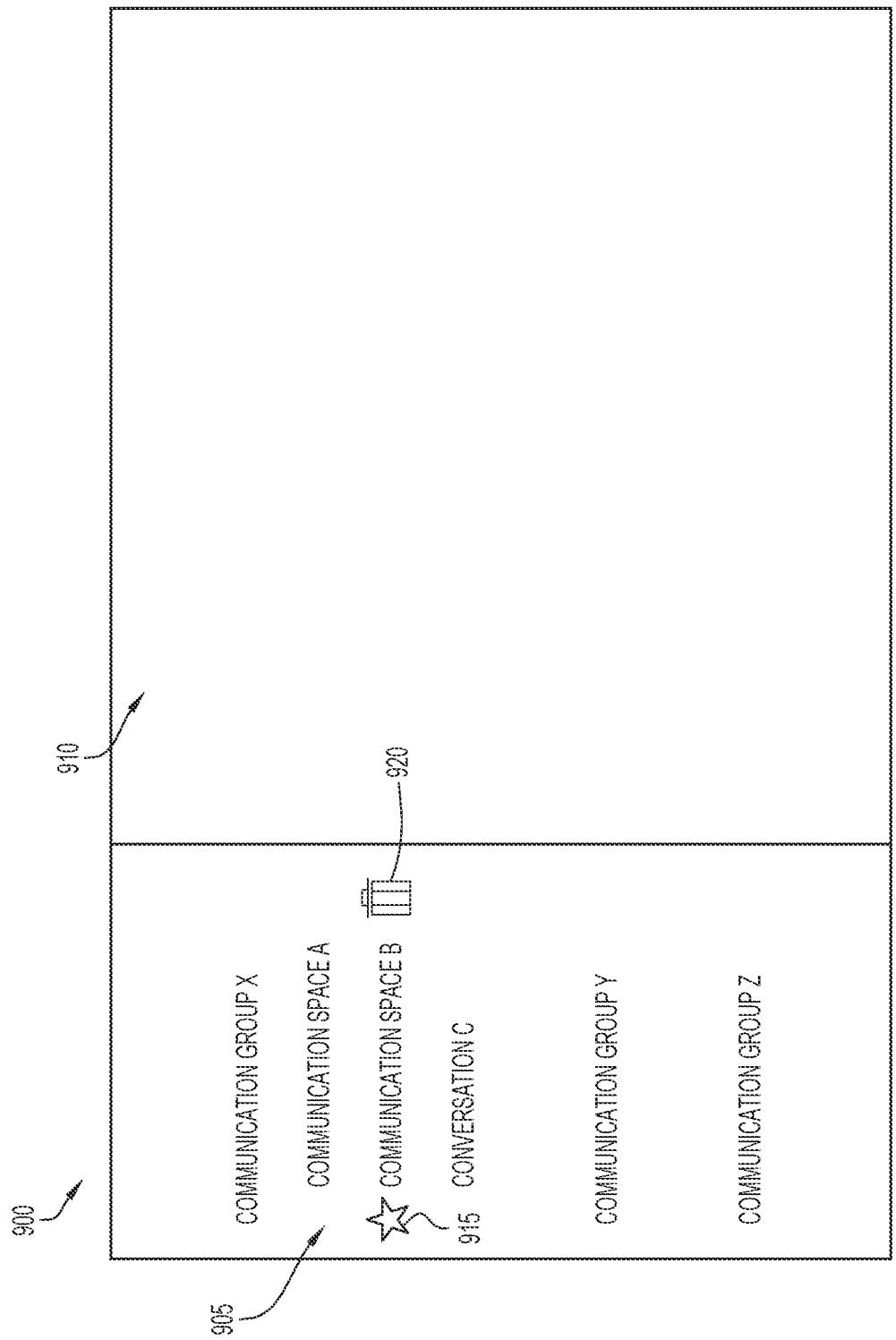
FIG. 9 is a user interface for presenting and accessing communication groups, according to an example embodiment.

With continued reference to FIGS. 1-8, FIG. 9 is a user interface for presenting and accessing communication groups according to an example embodiment. Interface 900 includes a communication session area 905 and a display area 910. Communication session area 905 may include communication groups (e.g., Communication Group X, Communication Group Y, and Communication Group Z as shown in FIG. 9) and unassigned communication sessions (e.g., communication spaces, conversations or threads, etc.). The items of a communication group (e.g., communication spaces, conversations or threads, etc.) may further be presented (or hidden) in communication session area 905 by expanding (or collapsing) (e.g., by clicking on an actuator) a selected communication group (e.g., Communication Space A, Communication Space B, Conversation C as shown in FIG. 9). The addition of communication spaces may be indicated by any suitable indicator or visualization 915 (e.g., symbol, font, bold, underline, color change, blinking or flashing, etc.). By way of example, an added communication space (e.g., Communication Space B) is indicated by a star in FIG. 9. A delete actuator 920 may be displayed to remove or delete an added communication space. The user may select (click on) a communication space or thread to access and/or participate in the communication session of the selected communication space or thread. The content of a selected communication space or thread may be presented in display area 910. Further, the user may delete an added communication space by actuating a corresponding delete actuator 920.

Figure 10:
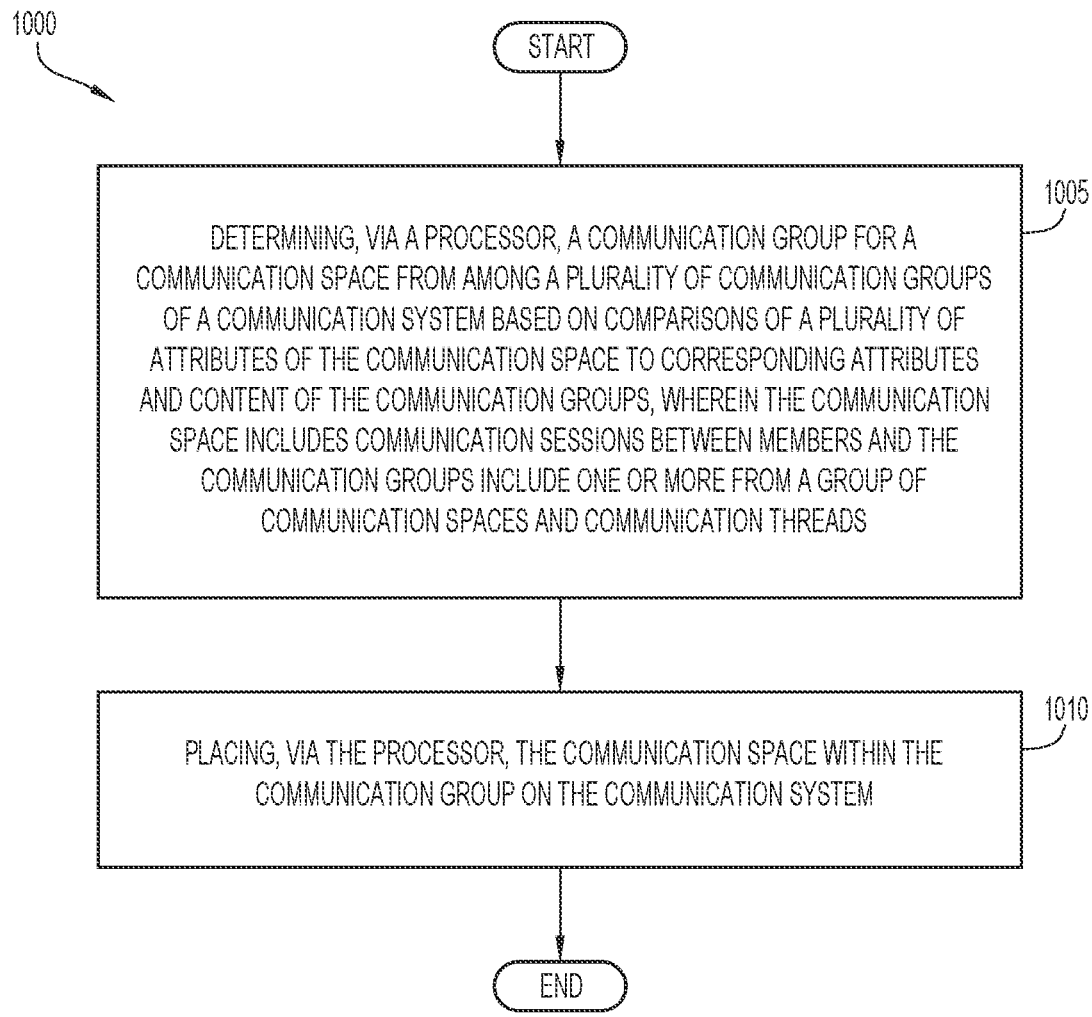
FIG. 10 illustrates a flowchart of a generalized method for managing communication groups, according to an example embodiment.

FIG. 10 is a flowchart of an example method 1000 for managing communication groups. At operation 1005, a communication group for a communication space is determined from among a plurality of communication groups of a communication system, via a processor, based on comparisons of a plurality of attributes of the communication space to corresponding attributes and content of the communication groups. The communication space includes communication sessions between members and the communication groups include one or more from a group of communication spaces and communication threads. At operation 1010, the communication space is placed, via the processor, within the communication group on the communication system.

Figure 11:
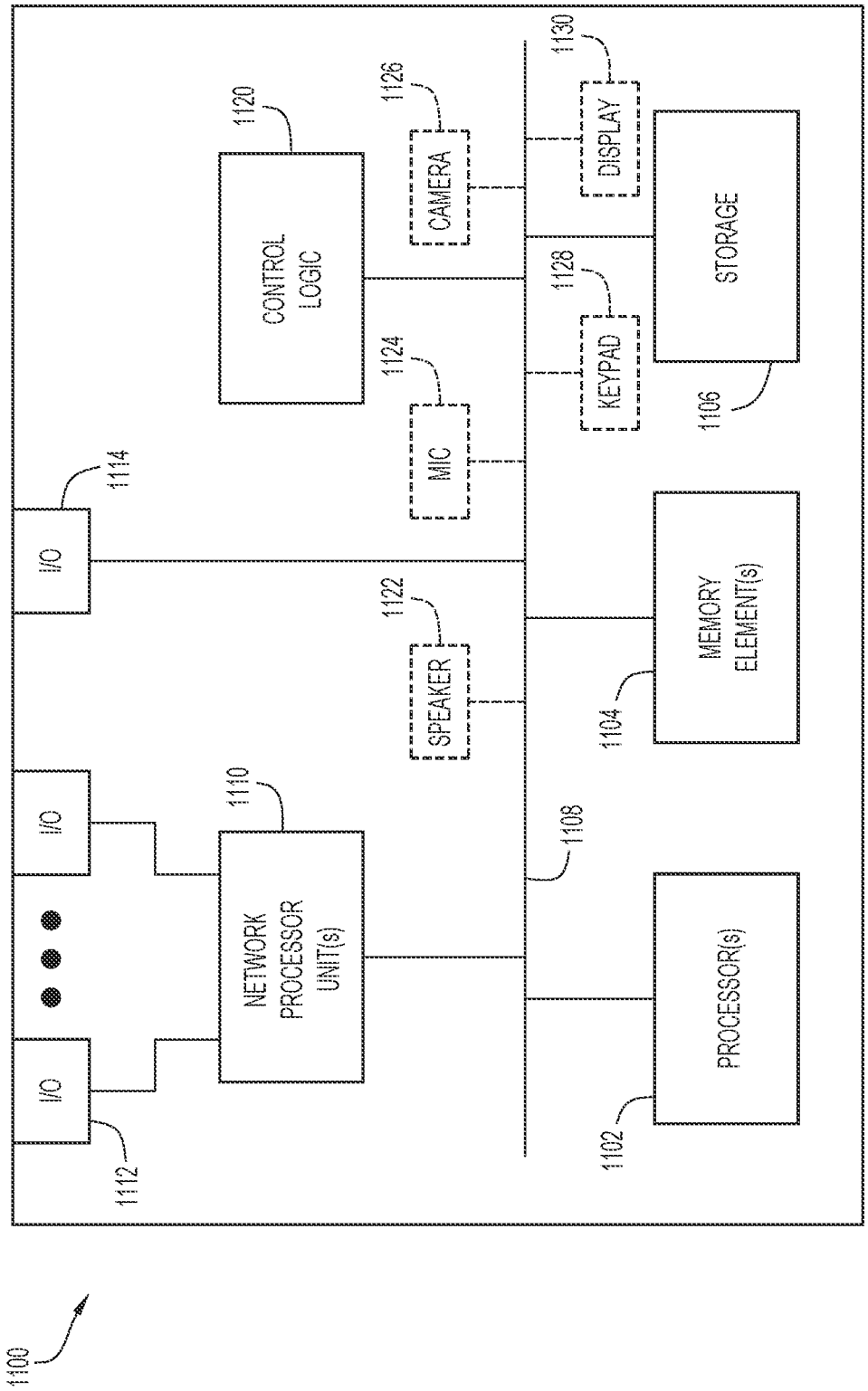
FIG. 11 illustrates a hardware block diagram of a computing device configured to perform functions associated with managing communication groups as discussed herein, according to an example embodiment.

Referring to FIG. 11, FIG. 11 illustrates a hardware block diagram of a computing device 1100 that may perform functions associated with operations discussed herein in connection with the techniques depicted in FIGS. 1-10. In various embodiments, a computing device or apparatus, such as computing device 1100 or any combination of computing devices 1100, may be configured as any device entity/entities (e.g., computer devices, supervisor or other server systems, endpoint devices, etc.) as discussed for the techniques depicted in connection with FIGS. 1-10 in order to perform operations of the various techniques discussed herein.

In at least one embodiment, computing device 1100 may be any apparatus that may include one or more processor(s) 1102, one or more memory element(s) 1104, storage 1106, a bus 1108, one or more network processor unit(s) 1110 interconnected with one or more network input/output (I/O) interface(s) 1112, one or more I/O interface(s) 1114, and control logic 1120. In various embodiments, instructions associated with logic for computing device 1100 can overlap in any manner and are not limited to the specific allocation of instructions and/or operations described herein.

In at least one embodiment, processor(s) 1102 is/are at least one hardware processor configured to execute various tasks, operations and/or functions for computing device 1100 as described herein according to software and/or instructions configured for computing device 1100. Processor(s) 1102 (e.g., a hardware processor) can execute any type of instructions associated with data to achieve the operations detailed herein. In one example, processor(s) 1102 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 1104 and/or storage 1106 is/are configured to store data, information, software, and/or instructions associated with computing device 1100, and/or logic configured for memory element(s) 1104 and/or storage 1106. For example, any logic described herein (e.g., control logic 1120) can, in various embodiments, be stored for computing device 1100 using any combination of memory element(s) 1104 and/or storage 1106. Note that in some embodiments, storage 1106 can be consolidated with memory elements 1104 (or vice versa), or can overlap/exist in any other suitable manner.

In at least one embodiment, bus 1108 can be configured as an interface that enables one or more elements of computing device 1100 to communicate in order to exchange information and/or data. Bus 1108 can be implemented with any architecture designed for passing control, data and/or information between processors, memory elements/storage, peripheral devices, and/or any other hardware and/or software components that may be configured for computing device 1100. In at least one embodiment, bus 1108 may be implemented as a fast kernel-hosted interconnect, potentially using shared memory between processes (e.g., logic), which can enable efficient communication paths between the processes.

In various embodiments, network processor unit(s) 1110 may enable communication between computing device 1100 and other systems, entities, etc., via network I/O interface(s) 1112 to facilitate operations discussed for various embodiments described herein. In various embodiments, network processor unit(s) 1110 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 1100 and other systems, entities, etc. to facilitate operations for various embodiments described herein. In various embodiments, network I/O interface(s) 1112 can be configured as one or more Ethernet port(s), Fibre Channel ports, any other I/O port(s), and/or antenna(s)/antenna array(s) now known or hereafter developed. Thus, the network processor unit(s) 1110 and/or network I/O interfaces 1112 may include suitable interfaces for receiving, transmitting, and/or otherwise communicating data and/or information in a network environment.

I/O interface(s) 1114 allow for input and output of data and/or information with other entities that may be connected to computing device 1100. For example, I/O interface(s) 1114 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

With respect to certain entities (e.g., computer device, endpoint device, etc.), computing device 1100 may further include, or be coupled to, an audio speaker 1122 to convey sound, microphone or other sound sensing device 1124, camera or image capture device 1126, a keypad or keyboard 1128 to enter information (e.g., alphanumeric information, etc.), and/or a touch screen or other display 1130. These items may be coupled to bus 1108 or I/O interface(s) 1114 to transfer data with other elements of computing device 1100.

In various embodiments, control logic 1120 can include instructions that, when executed, cause processor(s) 1102 to perform operations, which can include, but not be limited to, providing overall control operations of computing device 1100; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

Present embodiments may provide various technical and other advantages. In an embodiment, the machine learning models may be dynamically updated or personalized to a user as the user selects, arranges, and/or modifies communication spaces and/or communication groups. Further, the machine learning models may be continuously updated (or trained) based on user feedback or selections/modifications of communication spaces and/or communication groups. For example, user feedback or modification of recommended communication groups may indicate a more preferable recommendation for the user. The feedback may be used to update or train the machine learning models with new or different training data (e.g., derived from attributes of the communication space and/or communication group, etc.) to enable placement of communication spaces, creation of communication groups, and/or naming of communication groups according to user preferences (e.g., the large language model (LLM) may be updated with respect to naming and/or content comparisons to adjust communication group determination and/or naming, etc.). Thus, the machine learning models may continuously evolve (or be trained) to learn characteristics of a specific user and/or improve placement of the communication spaces, creation of communication groups, and/or naming of communication groups with greater accuracy or relevancy to the user.

The programs and software described herein may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other stores or repositories, queue, etc.). The data transmitted between device entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., graphical user interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, datacenters, etc.). The computer or other processing systems employed by the present embodiments may be implemented by any number of any personal or other type of computer or processing system (e.g., desktop, laptop, Personal Digital Assistant (PDA), mobile devices, etc.), and may include any commercially available operating system and any combination of commercially available and custom software. These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flowcharts and diagrams illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., Local Area Network (LAN), Wide Area Network (WAN), Intranet, Internet, hardwire, modem connection, wireless, etc.). For example, the functions of the present embodiments may be distributed in any manner among the various end-user/client, server, and other processing devices or systems, and/or any other intermediary processing devices. The software and/or algorithms described above and illustrated in the flowcharts and diagrams may be modified in any manner that accomplishes the functions described herein. In addition, the functions in the flowcharts, diagrams, or description may be performed in any order that accomplishes a desired operation.

The networks of present embodiments may be implemented by any number of any type of communications network (e.g., LAN, WAN, Internet, Intranet, Virtual Private Network (VPN), etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., LAN, hardwire, wireless link, Intranet, etc.).

Each of the elements described herein may couple to and/or interact with one another through interfaces and/or through any other suitable connection (wired or wireless) that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system. Any combination of interfaces can be provided for elements described herein in order to facilitate operations as discussed for various embodiments described herein.

In various embodiments, any device entity or apparatus as described herein may store data/information in any suitable volatile and/or non-volatile memory item (e.g., magnetic hard disk drive, solid state hard drive, semiconductor storage device, Random Access Memory (RAM), Read Only Memory (ROM), Erasable Programmable ROM (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more device entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, Digital Signal Processing (DSP) instructions, software [potentially inclusive of object code and source code], etc.) for execution by one or more processor(s), and/or other similar machine, etc. Generally, memory element(s) 1104 and/or storage 1106 can store data, software, code, instructions (e.g., processor instructions), logic, parameters, combinations thereof, and/or the like used for operations described herein. This includes memory elements 1104 and/or storage 1106 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, Compact Disc ROM (CD-ROM), Digital Versatile Disc (DVD), memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any Local Area Network (LAN), Virtual LAN (VLAN), Wide Area Network (WAN) (e.g., the Internet), Software Defined WAN (SD-WAN), Wireless Local Area (WLA) access network, Wireless Wide Area (WWA) access network, Metropolitan Area Network (MAN), Intranet, Extranet, Virtual Private Network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may be directly or indirectly connected utilizing any algorithms, communication protocols, interfaces, etc. (proprietary and/or non-proprietary) that allow for the exchange of data and/or information.

In various example implementations, any device entity or apparatus for various embodiments described herein can encompass network elements (which can include virtualized network elements, functions, etc.) such as, for example, network appliances, forwarders, routers, servers, switches, gateways, bridges, load-balancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four device entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more device entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combinations of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

In one form, a method is provided. The method comprises: determining, via a processor, a communication group for a communication space from among a plurality of communication groups of a communication system based on comparisons of a plurality of attributes of the communication space to corresponding attributes and content of the communication groups, wherein the communication space includes communication sessions between members and the communication groups include one or more from a group of communication spaces and communication threads; and placing, via the processor, the communication space within the communication group on the communication system.

In one example, the communication group is determined in response to one of creation of the communication space and a user being invited to join the communication space.

In one example, the communication system includes one or more unassigned communication spaces, and the method further comprises: determining, via the processor, one or more particular communication groups, of the plurality of communication groups, on the communication system for the one or more unassigned communication spaces based on comparisons of attributes between the plurality of communication groups and the one or more unassigned communication spaces; and placing, via the processor, the one or more unassigned communication spaces in the one or more particular communication groups on the communication system.

In one example, the comparisons compare two or more from a group of: members of the communication space and the communication group, names of the communication space, communication group, and communication spaces within the communication group, theme of communications in the communication group and name of the communication space, and content of the communication space and communication group.

In one example, the method further comprises: removing, via the processor, the communication space from the communication group in response to an amount of user activity in the communication space being below a threshold level; and adding, via the processor, the communication space to the communication group after removal in response to detection of an amount of user activity in the communication space being above a threshold level.

In one example, the communication system includes a plurality of unassigned communication spaces, and the method further comprises: determining, via the processor, a set of unassigned communication spaces on the communication system based on comparisons of attributes; and recommending, via the processor, creation of a new communication group for the set of unassigned communication spaces and determining a new name for the new communication group based on content of the set of unassigned communication spaces.

In one example, determining the communication group further comprises: determining a score for each attribute compared for the plurality of communication groups; producing an overall score for each communication group by combining the score for each attribute of that communication group; and determining the communication group based on the overall score for each of the plurality of communication groups.

In another form, an apparatus is provided. The apparatus comprises: a communication system comprising one or more processors, wherein the one or more processors are configured to: determine a communication group for a communication space from among a plurality of communication groups of the communication system based on comparisons of a plurality of attributes of the communication space to corresponding attributes and content of the communication groups, wherein the communication space includes communication sessions between members and the communication groups include one or more from a group of communication spaces and communication threads; and place the communication space within the communication group on the communication system.

In another form, one or more non-transitory computer readable storage media are provided. The non-transitory computer readable storage media are encoded with processing instructions that, when executed by one or more processors, cause the one or more processors to: determine a communication group for a communication space from among a plurality of communication groups of a communication system based on comparisons of a plurality of attributes of the communication space to corresponding attributes and content of the communication groups, wherein the communication space includes communication sessions between members and the communication groups include one or more from a group of communication spaces and communication threads; and place the communication space within the communication group on the communication system.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
    determining, via a processor, a communication group for a communication space from among a plurality of communication groups of a communication system based on comparisons of a plurality of attributes of the communication space to corresponding attributes and content of the plurality of communication groups, wherein the communication space contains individual communication sessions between members of the communication space and corresponding content of the communication sessions and the plurality of communication groups each include one or more from a group of communication spaces and communication threads, and wherein determining the communication group comprises:
  determining a score for each attribute compared for the plurality of communication groups;
  producing an overall score for each communication group by combining the score for each attribute of that communication group; and
  determining the communication group based on the overall score for each of the plurality of communication groups; and
placing, via the processor, the communication space within the communication group on the communication system.

2. The method of claim 1, wherein the communication group is determined in response to one of creation of the communication space and a user being invited to join the communication space.

3. The method of claim 1, wherein the communication system includes one or more unassigned communication spaces, and the method further comprises:
  determining, via the processor, one or more particular communication groups, of the plurality of communication groups, on the communication system for the one or more unassigned communication spaces based on comparisons of attributes between the plurality of communication groups and the one or more unassigned communication spaces; and
  placing, via the processor, the one or more unassigned communication spaces in the one or more particular communication groups on the communication system.

4. The method of claim 1, wherein the comparisons compare two or more from a group of: members of the communication space and the communication group, names of the communication space, communication group, and communication spaces within the communication group, theme of communications in the communication group and name of the communication space, and content of the communication space and communication group.

5. The method of claim 1, further comprising:
  removing, via the processor, the communication space from the communication group in response to an amount of user activity in the communication space being below a threshold level; and
  adding, via the processor, the communication space to the communication group after removal in response to detection of an amount of user activity in the communication space being above a threshold level.

6. The method of claim 1, wherein the communication system includes a plurality of unassigned communication spaces, and the method further comprises:
  determining, via the processor, a set of unassigned communication spaces on the communication system based on comparisons of attributes; and
  recommending, via the processor, creation of a new communication group for the set of unassigned communication spaces and determining a new name for the new communication group based on content of the set of unassigned communication spaces.

7. The method of claim 1, wherein determining the communication group uses machine learning.

8. An apparatus comprising:
  a communication system comprising one or more processors, wherein the one or more processors are configured to:
    determine a communication group for a communication space from among a plurality of communication groups of the communication system based on comparisons of a plurality of attributes of the communication space to corresponding attributes and content of the plurality of communication groups, wherein the communication space contains individual communication sessions between members of the communication space and corresponding content of the communication sessions and the plurality of communication groups each include one or more from a group of communication spaces and communication threads, and wherein determining the communication group comprises: determining a score for each attribute compared for the plurality of communication groups, producing an overall score for each communication group by combining the score for each attribute of that communication group, and determining the communication group based on the overall score for each of the plurality of communication groups; and
    place the communication space within the communication group on the communication system.

9. The apparatus of claim 8, wherein the communication group is determined in response to one of creation of the communication space and a user being invited to join the communication space.

10. The apparatus of claim 8, wherein the communication system includes one or more unassigned communication spaces, and the one or more processors are further configured to:
  determine one or more particular communication groups, of the plurality of communication groups, on the communication system for the one or more unassigned communication spaces based on comparisons of attributes between the plurality of communication groups and the one or more unassigned communication spaces; and
  place the one or more unassigned communication spaces in the one or more particular communication groups on the communication system.

11. The apparatus of claim 8, wherein the comparisons compare two or more from a group of: members of the communication space and the communication group, names of the communication space, communication group, and communication spaces within the communication group, theme of communications in the communication group and name of the communication space, and content of the communication space and communication group.

12. The apparatus of claim 8, wherein the one or more processors are further configured to:
  remove the communication space from the communication group in response to an amount of user activity in the communication space being below a threshold level; and
  add the communication space to the communication group after removal in response to detection of an amount of user activity in the communication space being above a threshold level.

13. The apparatus of claim 8, wherein the communication system includes a plurality of unassigned communication spaces, and the one or more processors are further configured to:
  determine a set of unassigned communication spaces on the communication system based on comparisons of attributes; and recommend creation of a new communication group for the set of unassigned communication spaces and determine a new name for the new communication group based on content of the set of unassigned communication spaces.

14. One or more non-transitory computer readable storage media encoded with processing instructions that, when executed by one or more processors, cause the one or more processors to:
- determine a communication group for a communication space from among a plurality of communication groups of a communication system based on comparisons of a plurality of attributes of the communication space to corresponding attributes and content of the plurality of communication groups, wherein the communication space contains individual communication sessions between members of the communication space and corresponding content of the communication sessions and the plurality of communication groups each include one or more from a group of communication spaces and communication threads, and wherein determining the communication group comprises: determining a score for each attribute compared for the plurality of communication groups, producing an overall score for each communication group by combining the score for each attribute of that communication group, and determining the communication group based on the overall score for each of the plurality of communication groups; and
- place the communication space within the communication group on the communication system.

15. The one or more non-transitory computer readable storage media of claim 14, wherein the communication group is determined in response to one of creation of the communication space and a user being invited to join the communication space.

16. The one or more non-transitory computer readable storage media of claim 14, wherein the communication system includes one or more unassigned communication spaces, and the processing instructions further cause the one or more processors to:
- determine one or more particular communication groups, of the plurality of communication groups, on the communication system for the one or more unassigned communication spaces based on comparisons of attributes between the plurality of communication groups and the one or more unassigned communication spaces; and
- place the one or more unassigned communication spaces in the one or more particular communication groups on the communication system.

17. The one or more non-transitory computer readable storage media of claim 14, wherein the comparisons compare two or more from a group of: members of the communication space and the communication group, names of the communication space, communication group, and communication spaces within the communication group, theme of communications in the communication group and name of the communication space, and content of the communication space and communication group.

18. The one or more non-transitory computer readable storage media of claim 14, wherein the processing instructions further cause the one or more processors to:
- remove the communication space from the communication group in response to an amount of user activity in the communication space being below a threshold level; and
- add the communication space to the communication group after removal in response to detection of an amount of user activity in the communication space being above a threshold level.

19. The one or more non-transitory computer readable storage media of claim 14, wherein the communication system includes a plurality of unassigned communication spaces, and the processing instructions further cause the one or more processors to:
- determine a set of unassigned communication spaces on the communication system based on comparisons of attributes; and
- recommend creation of a new communication group for the set of unassigned communication spaces and determine a new name for the new communication group based on content of the set of unassigned communication spaces.

20. The one or more non-transitory computer readable storage media of claim 14, wherein determining the communication group uses machine learning.

* * * * *